United States Patent
Kleinschnittger et al.

(10) Patent No.: US 12,384,632 B2
(45) Date of Patent: Aug. 12, 2025

(54) BELT CONVEYOR INCLUDING FREEWHEELING SUPPORT ROLLERS AND DRIVING PORTIONS

(71) Applicant: RO-BER Industrieroboter GmbH, Kamen (DE)

(72) Inventors: Werner Kleinschnittger, Wickede (DE); Elmar Stöve, Dortmund (DE)

(73) Assignee: RO-BER Industrieroboter GmbH, Kamen (DE)

( * ) Notice: Subject to any disclaimer, the term of this patent is extended or adjusted under 35 U.S.C. 154(b) by 0 days.

(21) Appl. No.: 18/849,850

(22) PCT Filed: Mar. 22, 2023

(86) PCT No.: PCT/EP2023/057345
§ 371 (c)(1),
(2) Date: Sep. 23, 2024

(87) PCT Pub. No.: WO2023/186662
PCT Pub. Date: Oct. 5, 2023

(65) Prior Publication Data
US 2025/0108980 A1    Apr. 3, 2025

(30) Foreign Application Priority Data
Mar. 31, 2022    (DE) .............. 10 2022 107 722.5

(51) Int. Cl.
*B65G 17/24*    (2006.01)
*B65G 17/08*    (2006.01)
(Continued)

(52) U.S. Cl.
CPC .......... *B65G 47/31* (2013.01); *B65G 17/083* (2013.01); *B65G 17/24* (2013.01); *B65G 47/57* (2013.01)

(58) Field of Classification Search
CPC ...... B65G 17/083; B65G 17/24; B65G 47/31; B65G 47/57
(Continued)

(56) References Cited

U.S. PATENT DOCUMENTS

| 3,894,627 | A | | 7/1975 | Jabbusch et al. |
| 4,293,064 | A | * | 10/1981 | Robinson ............... B65G 17/24 |
| | | | | 198/779 |

(Continued)

FOREIGN PATENT DOCUMENTS

| DE | 9016838 U1 | 2/1991 |
| DE | 10146981 A1 | 4/2003 |

(Continued)

OTHER PUBLICATIONS

International Preliminary Report on Patentability for International Application for International Application No. PCT/EP2023/057345, mailed Oct. 10, 2024.

(Continued)

*Primary Examiner* — Douglas A Hess
(74) *Attorney, Agent, or Firm* — Jason H. Vick; Amped IP LLC

(57) ABSTRACT

A belt conveyor for generating a predetermined transport distance between a first item and a second item. The conveyor includes a conveyor belt configured for endless circulation, wherein links include a plurality of first links each of which include one freewheeling roller having a first coefficient of friction. Contact areas between the freewheeling rollers and the items define a transport surface on which the items rest during transport. The links further have at least one second link that has a driving portion, which is arranged in the transport surface and has a second coefficient of friction. Each of the second links is positioned in relation to the conveyor such that the first and second items are driven (Continued)

by the respective driving portion while the conveyor is moved under the first and second items and while bottom sides of the first and second items are in contact with the moving belt.

25 Claims, 10 Drawing Sheets

(51) Int. Cl.
*B65G 47/31* (2006.01)
*B65G 47/57* (2006.01)

(58) Field of Classification Search
USPC .............................................. 198/461.1, 779
See application file for complete search history.

(56) References Cited

U.S. PATENT DOCUMENTS

| | | | | | |
|---|---|---|---|---|---|
| 5,330,045 | A * | 7/1994 | Hodlewsky | ............ | B65G 17/08 |
| | | | | | 198/779 |
| 7,311,192 | B2 * | 12/2007 | Fourney | ................ | B65G 17/24 |
| | | | | | 198/779 |
| 7,360,641 | B1 * | 4/2008 | Fourney | ................ | B65G 17/40 |
| | | | | | 198/779 |
| 7,506,750 | B2 * | 3/2009 | Costanzo | ............... | B65G 17/24 |
| | | | | | 198/779 |
| 8,342,313 | B2 * | 1/2013 | Wargo | .................... | B65G 47/29 |
| | | | | | 198/419.1 |
| 8,365,902 | B2 * | 2/2013 | Costanzo | ............... | B65G 17/40 |
| | | | | | 198/779 |
| 8,424,675 | B2 * | 4/2013 | Rau | ........................ | B65G 17/24 |
| | | | | | 198/779 |
| 8,944,236 | B2 * | 2/2015 | Fourney | ............. | B65G 47/8823 |
| | | | | | 198/779 |
| 9,010,523 | B2 * | 4/2015 | Fourney | ................ | B65G 13/00 |
| | | | | | 198/779 |
| 9,079,717 | B1 * | 7/2015 | Costanzo | ............. | B65G 39/025 |
| 9,908,717 | B2 * | 3/2018 | Stefanko | ................ | B65G 39/20 |
| 10,457,495 | B2 * | 10/2019 | Stefanko | ................ | B65G 17/24 |

FOREIGN PATENT DOCUMENTS

| | | |
|---|---|---|
| EP | 2089297 B1 | 9/2013 |
| EP | 3334667 | 7/2020 |
| WO | WO 2008/076732 A2 | 6/2008 |
| WO | WO 2010/029561 A1 | 3/2010 |

OTHER PUBLICATIONS

International Search Report for International Application No. PCT/EP2023/057345, mailed Jun. 29, 2023.
Written Opinion for International Application No. PCT/EP2023/057345, mailed Jun. 29, 2023.
Office Action (Including Translation) for corresponding German Patent Application No. 102022107722.5, mailed Jan. 28, 2023.
Decision to Grant (Including Translation) for corresponding German Patent Application No. 102022107722.5, mailed Apr. 19, 2023.

* cited by examiner

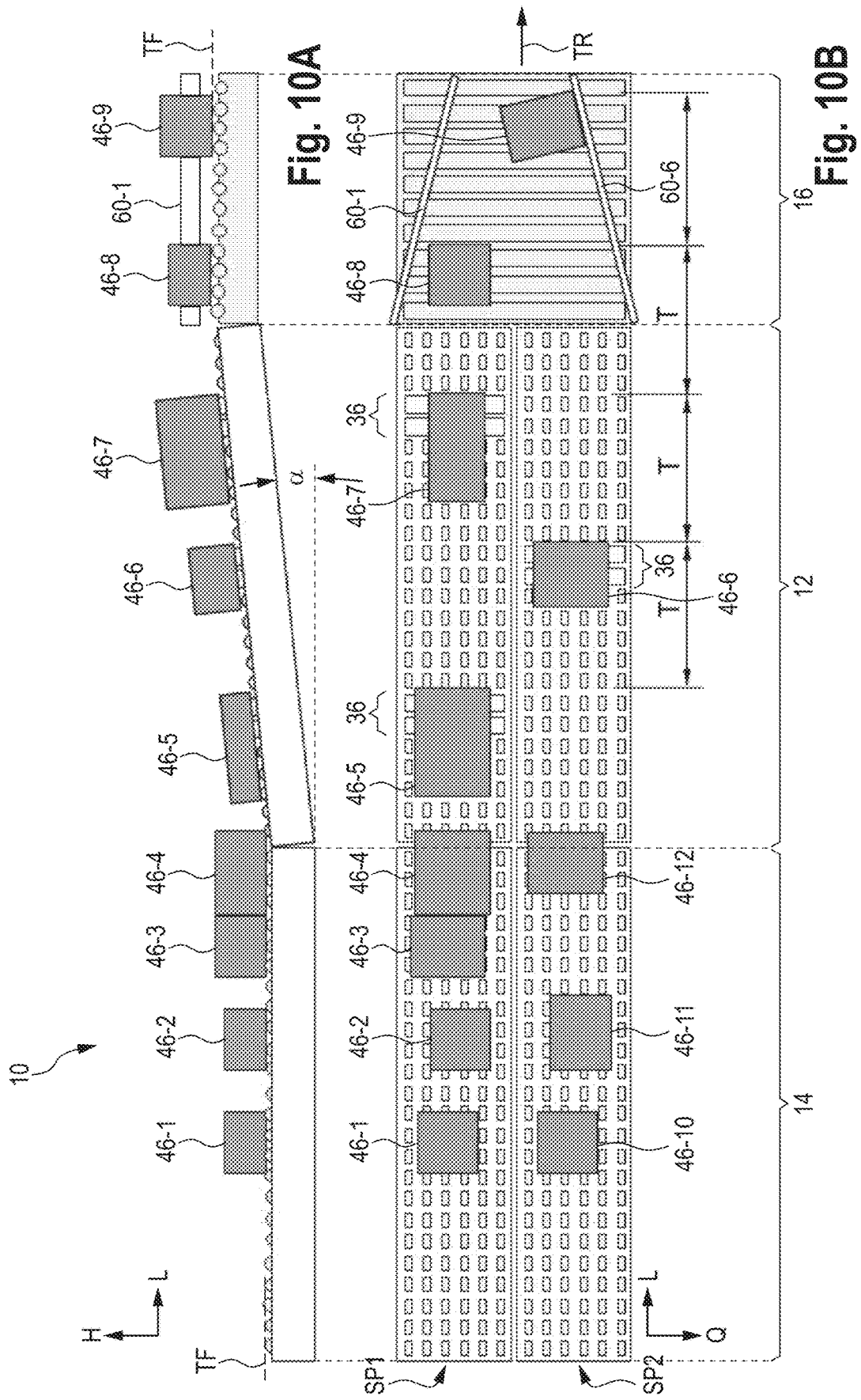

BELT CONVEYOR INCLUDING FREEWHEELING SUPPORT ROLLERS AND DRIVING PORTIONS

CROSS REFERENCE TO RELATED APPLICATIONS

This application is a national stage application under 35 U.S.C. 371 of PCT Application No. PCT/EP2023/057345 having an international filing date of 22 Mar. 2023, which designated the United States, which PCT application claimed the benefit of German Application No. 10 2022 107 722.5, filed 31 Mar. 2022, each of which are incorporated herein by reference in their entirety.

The present disclosure relates to an (accumulation-roller) belt conveyor configured to set predetermined distances between conveying items of a stream of conveying items, wherein the belt conveyor comprises freewheeling support rollers on which the conveying items rest. Further, the disclosure relates to a conveyor system including a corresponding belt conveyor.

Conveyor systems are known, which are used to separate cases initially provided in the form of individual pallet layers. For this purpose, several conveyor modules are cascade-like arranged one after the other and adjacent to one another. The modules are operated at different speeds, wherein the downstream modules are operated preferably at a higher speed than the directly adjacent modules upstream. In this manner, gaps can be created in parallel to the conveying direction between individual rows of cases of the pallet layer. For separating further cases in the already equalized rows, neighboring modules are, for example, aligned differently (e.g., through a 90° curve). In addition to classic belt conveyors, conveyor modules including endless circulating conveyor belts are used, which in turn are formed of a plurality of links being connected to each other in an articulated manner. Each of the links comprises further at least one freewheeling support roller projecting vertically beyond a basic body of the link in order to define a transport surface on which the cases rest. These support rollers can be driven in a targeted manner, for example, by applying a targeted force from below for moving the cases in a different direction in addition to the actual movement of the belt. A corresponding conventional conveyor system is retrievable on the Internet at "wwp.intralox.com" under the product "ARB Pallet Layer Discrambler S400".

An alternative layer-separating system is offered, for example, under the name "celluveyor DEPAL".

A basic prerequisite for the separation and safe transport is that the bottom surfaces of the conveying items have a flat base area. This prerequisite is not always given, in particular when the conveying items (e.g. six-pack of PET bottles) are shrink-wrapped with a PVC protective film.

Moreover, the previously known systems often require the use of a camera system for product and position recognition in order to be able to act specifically on individual cases in the pallet layer. This results in greater control effort and high demands on the cases themselves. For example, the cases need to be optically recognizable well in order to be able to identify them and the position thereof by means of image processing.

The document DE 101 46 981 A1 relates to an accumulation conveyor including a roller chain on which the support pieces can be attached in order to allow transfer of conveying items without slip.

Therefore, it is an object of the present disclosure to provide a conveyor and a conveyor system enlarging the spectrum of the products to be separated, enhancing the independency from product characteristics, and minimizing control effort.

This object is solved by a belt conveyor for generating a predetermined transport distance between a first conveying item and a second conveying item, preferably provided without distance between the same in a stream of conveying items, along a (main) transport direction of the belt conveyor, wherein the belt conveyor comprises a conveyor belt configured for endless circulation and formed of links connected to each other in an articulated manner, wherein the links comprise a plurality of first links each of which comprises a (in the transport direction) freewheeling roller having a (conveying-item specific) first coefficient of friction, wherein contact areas (point, line, or surface area) between the freewheeling rollers and the conveying items define a (substantially flat) transport surface on which the conveying items to be transported rest during transport on the belt conveyor, wherein the links further comprise at least one second link having a driving portion arranged in the transport surface and having a second coefficient of (static and/or dynamic) friction greater than the first coefficient of friction, wherein each of the second links is positioned in relation to the conveyor belt such that the first and second conveying items are driven, in particular only, by the respective driving portion in the predetermined transport distance while the conveyor belt is moved (continuously) under the first and second conveying items and while bottom sides of the first and second conveying items are (temporarily one after the other) in contact at least partially with the moving conveyor belt.

This belt conveyors enables generation of distances of conveying items in the transport direction in a purely mechanical way without using camera systems, additional actuators, and elaborate controlling algorithms. The conveyor belt of the belt conveyor is provided with areas resulting in a higher frictional resistance between the conveying items and the conveyor belt. These areas are formed by the driving portions. The driving portions represent specific areas of the conveyor belt which drive the conveying items in comparison to the other areas. The other areas slide and/or roll under the conveying items without driving the conveying items. Thus, the (mechanical) distribution and arrangement of the driving portions alone can effect a separation of conveying items in a stream in which the conveying items are arranged without distance to each other.

Preferably, each of the links has an identical basic body extending, during the transport, substantially perpendicular to the transport direction of the belt conveyor, wherein preferably the freewheeling rollers are attached, in parallel rows perpendicular to the transport direction, to the basic bodies of the first links.

If all links have an identical basic body, the driving portions can be re-positioned easily, in particular when the links themselves need to be replaced for this purpose. With other words, the conveyor belt is formed of identically shaped basic elements which are formed differently with regard to their takeaway properties. The disassembly and reassembly of the links for forming the conveyor belt is simplified by this measure.

In particular, the at least one second link is formed roller-free so that the driving portion thereof, instead of the respectively at least one freewheeling roller of the first link, in particular with a friction element, projects into, or beyond the transport surface.

Alternatively, each of the links comprises at least one freewheeling roller, wherein the driving portion of the at least one second link is realized by the respectively at least one freewheeling roller, the freewheeling of which can be inhibited or locked.

Thus, there are two types of second links. The first type does not distinguish optically from the normal links (including normal freewheeling rollers) by enabling to inhibit or lock the freewheeling rollers in a targeted manner in the normal state. When all links of the conveyor belt are second links including rollers, which can be inhibited or locked, reconfiguration of the driving portions (and thereby the desired distances) is simplified by inhibiting or locking the rollers of the required links in a targeted manner. In this case, replacement of links is not required.

Otherwise, the conveyor belt must be dismantled, and the second links must be re-positioned, as it is the case when the driving portions are not implemented by the rollers which are normally freewheeling. For example, the driving portions can be realized by (rigid) friction elements. The friction elements can simply be distinguished visually by a technician from the first links including rollers. The corresponding second links can be found optically in a simple manner which simplifies the maintenance.

The relative positioning of these second links is easier to verify optically. Errors during commissioning, i.e. when positioning the second links within the conveyor belt, are easier to locate and rectify.

In a further alternative, all links are formed identically, wherein the driving portions of the at least one second links is realized by a separate driving element covering the at least one freewheeling roller of the respective second link such that the corresponding driving element, instead of the at least one freewheeling roller of the respective second link, is in contact with one of the first and second conveying items during the transport.

The driving element provided separately, and can be positioned on arbitrary ones of the first links including the freewheeling rollers of the entire belt, which thereby become second links. Also, in this case the position of the driving portion is optically recognizable.

Further, the driving elements can be repositioned easily by, for example, manually removing the driving elements and re-installing the same at a different location, e.g., by attaching the driving element on one or more other freewheeling rollers of the first links. Also, the length of the driving portion (in the width direction of the conveyor) can be configured easily in this manner by cutting the driving element (such as a rubber profile from the role) to size and mounting it on the first links including the rollers.

Preferably, the driving element is fixed in a form-fitting detachable manner on at least one of the freewheeling rollers of the respective second link.

The positive fit supports the easy assembly and disassembly of the driving element. The driving element is re-usable and optically recognizable. One single freewheeling roller is sufficient for installing the driving element, in particular in a loss-proof manner.

In general, in this embodiment the coefficient of (rolling) friction, or the number of friction, of the rolling freewheeling roller is replaced by the coefficient of (static and/or dynamic) friction of the material of the driving element. For example, rubber, plastics, and metals are materials suitable for the driving element. Chrome-plated steel has distinguished itself from other materials due to its wear behavior compared to other materials. Bright stainless steel would also be suitable.

Alternatively, the driving element can be detachably attached to a basic body of the respective second link.

For example, instead of attaching the driving element on the roller, it can also be fixed to the basic body of the corresponding link by means of a screw. Also in this case, the driving element can be re-positioned easily by unscrewing it from the original second link and screwing it onto another first link, which thus becomes the second link.

Further, the object is solved by a conveyor system comprising: a feeding conveyor, which preferably is an accumulation conveyor with or without freewheeling support rollers; a discharging conveyor; and a belt conveyor of the type described above, which is arranged in a transport direction between the feeding conveyor and the discharging conveyor; the feeding conveyor and the discharging conveyor each being directly adjacent to belt conveyor in the transport direction.

Preferably, the belt conveyor is operated at a first, in particular continuous, speed. The feeding conveyor is operated at a second speed less than or equal to the first speed. The discharging conveyor is operated at a third speed corresponding to the first speed.

This distribution of speeds ensures that the conveying items are safely removed from the feeding conveyor and delivered without any change in distance from the belt conveyor to the discharging conveyor.

Further it is advantageous if the feeding conveyor and the discharging conveyor are oriented horizontally and if the belt conveyor is oriented in the transport direction with an angle of inclination $\alpha$, which preferably is in a range from 2 degree to 30 degree.

The ascending belt conveyor ensures that the freewheeling rollers of the links pass under the conveying items provided. Since the passing belt conveyor pushes, due to rolling friction between the rollers and the bottom side of the conveying items, the conveying item nevertheless with a corresponding rolling-friction force, the downhill force caused by the inclined plane safely ensures that the conveying item provided is not driven. The provided conveying item is only driven in case the driving portion, which effects a higher frictional resistance, gets under the provided conveying item.

In this manner, it is possible that the feeding conveyor acts with a certain accumulation pressure on the conveying item to be provided, which is provided in the transition area between the feeding conveyor and the belt conveyor, without the need to provide mechanical stops for retaining the conveying item provided.

In particular, the feeding conveyor is configured and arranged to provide the first and second conveying items one after the other at its downstream end such that the freewheeling rollers of the first links of the belt conveyor are permanently in contact at least with a downstream end portion of a bottom side of the conveying item(s) provided.

Further, it is preferred to operate the belt conveyor permanently at a preferably constant speed.

By this measure controlling effort is reduced to zero. Also, a camera system for separating is not needed, even not for setting a desired distance between neighboring conveying items.

The belt conveyor can be used as a separating conveyor, fusion conveyor, or pallet-layer separating device.

Preferably, the belt conveyor has a multi-track design.

In case of a multi-track design, the belt conveyor can be used in particular as a fusion conveyor for fusing several conveying streams with each other without collisions.

It is understood that the above-mentioned features, which will be explained below, are conceivable not only on their down, but also in combinations without departing from the scope of the disclosure.

Embodiments of the disclosure are shown in the following drawings and will be described in more detail with reference thereto.

FIG. 10 shows a side view (FIG. 10A) of a conveyor system analogously to the conveyor systems of FIGS. 5 and 6, and a top view (FIG. 10B) of the same conveyor system.

The devices described below can be used either in distribution centers or in goods receipt of production centers. In particular, the devices are used for order picking in intralogistics.

Figure 1:
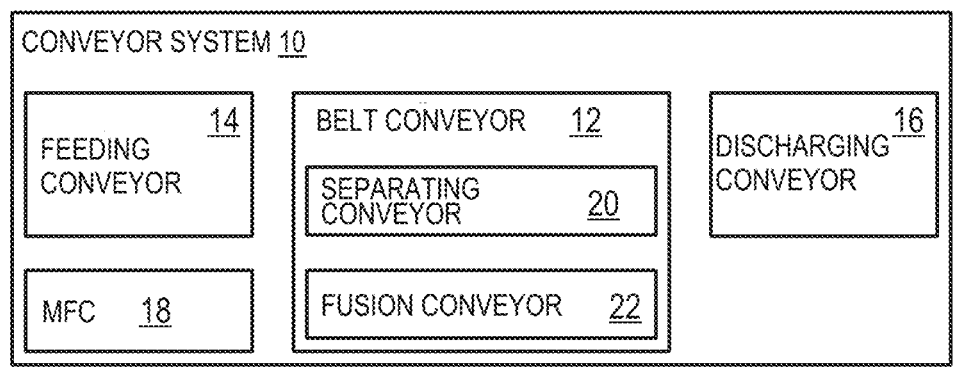
FIG. 1 shows a block diagram of a conveyor system.

FIG. 1 shows a block diagram of a conveyor system 10. The conveyor system 10 comprises a belt conveyor 12. The conveyor system 10 can further comprise a feeding conveyor 14, a discharging conveyor 16, and/or a material-flow computer (MFC) 18. The material-flow computer 18 is connected, for communication, via fixed lines and/or wirelessly (not shown) to the conveyors 12, 14, and 16.

The belt conveyor 12 can be operated, for example, as separating conveyor 20 or fusion conveyor 22, as will be described in more detail below with reference to the FIGS. 6 and 10.

Figure 2:
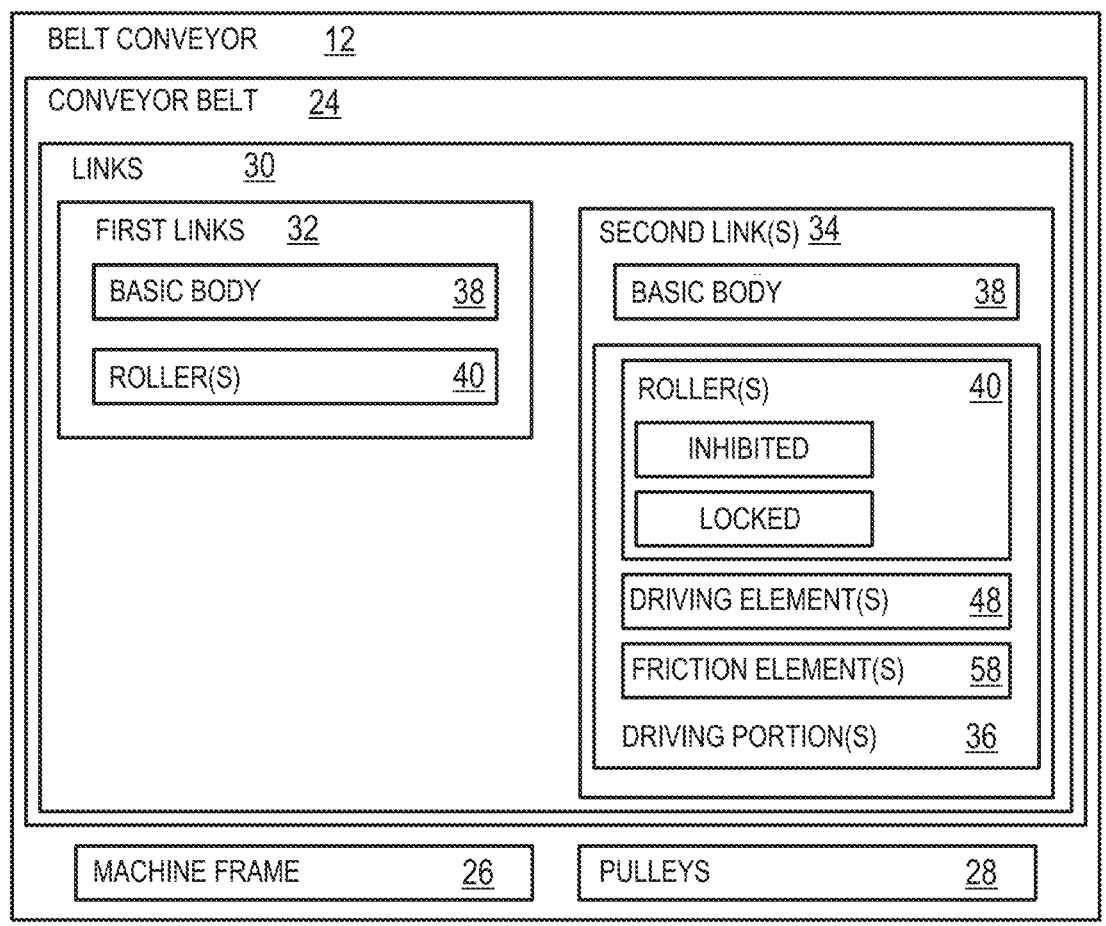
FIG. 2 shows a block diagram of a belt conveyor.

FIG. 2 shows a block diagram of the belt conveyor 12 of FIG. 1. The belt conveyor 12 comprises a multi-link conveyor belt 24, a machine frame 26, and at least two pulleys 28. The conveyor belt 24 is formed of a plurality of links 30, which are designed in the basic structure thereof preferably all identical, as will be explained below in more detail. The links 30 are configured to be connected to each other along a longitudinal direction L. All of the links 30 are connected to each other in an articulated manner in order to from the belt 24. The belt 24 is preferably self-contained for being guided endlessly circulating around the pulleys 28.

In particular, the conveyor belt 24 is formed of a plurality of links 32 of a first type, i.e. of first links 32, and of at least one link 34 of a second type, i.e. of at least one second link 34. The conveyor belt 24 comprises one or more driving portions 36, which can be formed separately to the first links 32 and/or as (integrated) part of the second links 34.

Each of the first links 32 comprises a basic body 38 and at least one freewheeling (support) roller 40. Support roller carries conveying items 46 (cf. FIG. 5) during transport. Freewheeling means that the roller 40 is supported substantially torque-free on or in the basic body 38.

Figure 3:
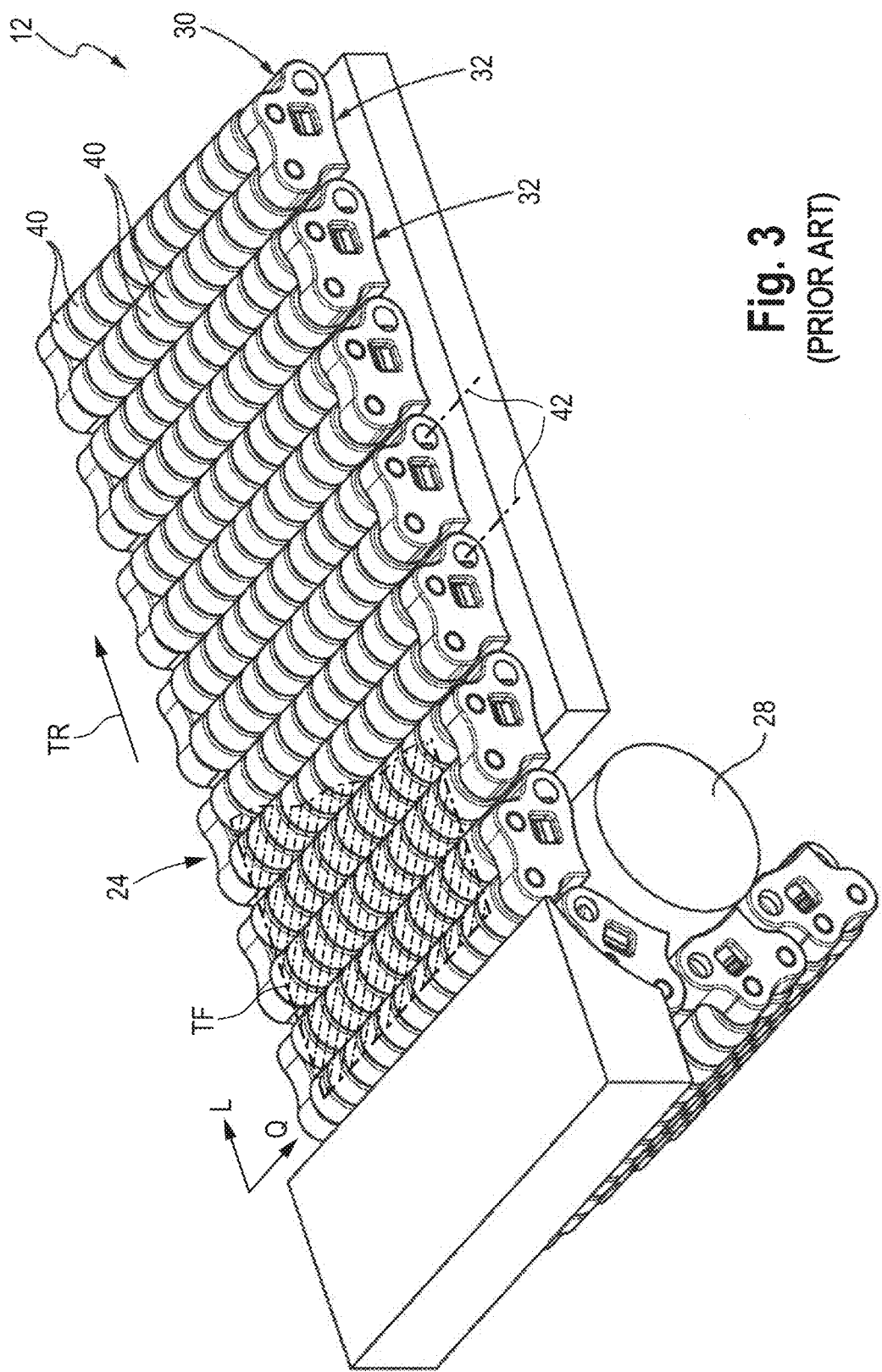
FIG. 3 shows a perspective view of a conventional belt conveyor including links connected to each other in an articulated manner.

Conventional link-belt conveyors with accumulation function consist of the first links 32 only, cf. FIG. 3.

Each of the second links 34 also comprises a basic body 28, at least one driving portion 36, and optionally one or more freewheeling (support) rollers 40. The basic bodies 38 of the first and second links 32 and 34 are preferably identical, in particular in relation to the their dimensions and joint connections in order to be connectable to each other in a replaceable manner.

When the driving portion 36 is implemented by a separately provided driving element 48, a first link 32 can be converted into a second link 34 by combining with the separately provided driving element 48. Alternatively, the driving portion 36 can be formed as an integral component of the second link 34, for example, by changing the frictional resistance exerted on the conveying item 46 by the roller 40 so that the roller 40, which is normally freewheeling, is locked, or so that the roller 40, which is normally freewheeling, is made sluggish. As long as the roller 40 is freewheeling, the frictional resistance thereof is caused by the rolling friction alone. When the roller 40 is sluggish, the (relatively speaking higher) frictional resistance is caused by a combination of sliding friction and rolling friction. When the roller 40 is locked, i.e. it can no longer rotate, the frictional resistance is caused by the (still higher) static friction.

FIG. 3 shows a perspective partial view of a conventional, by way of example, multi-link endless circulating belt conveyor 12, the links 30 of which comprise freewheeling (support) rollers 40 for implementing an accumulation function. The belt conveyor 12 of FIG. 3, which has one-track by way of example, is disclosed in the document EP 2 334 667 B1 to which it is referred to here. The belt conveyor 12 of FIG. 3 can be used for implementing the present invention, for example, by mounting separately provided driving elements 48 on the links 30, as shown, for example, in FIGS. 7 and 8. The basic structure of a belt conveyor 24 will be explained below using the FIGS. 3 and 4 as example, wherein at the same time variations of the specific embodiments shown in FIGS. 3 and 4 are discussed, which are not shown but may be used nevertheless for implementing the present invention.

In principle, the links 30 of the conveyor belt 24 are connected to one another in an articulated manner, wherein corresponding joint axes 42 extend transversely in a transverse direction Q, in particular perpendicular, to a longitudinal direction L of the belt 24. The links 30 are connected to one another in an articulated manner via joint pins 44, cf. FIG. 4, extending in the transverse direction Q. The longitudinal direction L is oriented parallel to the transport direction TR of the belt conveyor 12. The transverse direction Q is oriented perpendicular to the longitudinal direction L. In the example of FIG. 3, the links 30 comprise, for example, first links 32 only.

In the invention, the conveyor belt 24 is formed by several link types and comprises at least one second link 34. Irrespective of the number of link types used, the links 30 preferably each have an identically shaped basic body 38, which simplifies assembly of the belt 24 and replacement of individual links 30. This means that the first and second links 32 and 34 preferably comprise the same basic body 38. The rollers 40 are supported in a freewheeling manner in the basic body 38. It is understood that, in general, the links 30 can also be formed with less or more rollers 40, in particular with respectively one single roller 40 only. The second links 34 do not even have to comprise a (support) roller 40 (cf., e.g., FIG. 9).

Figure 4:
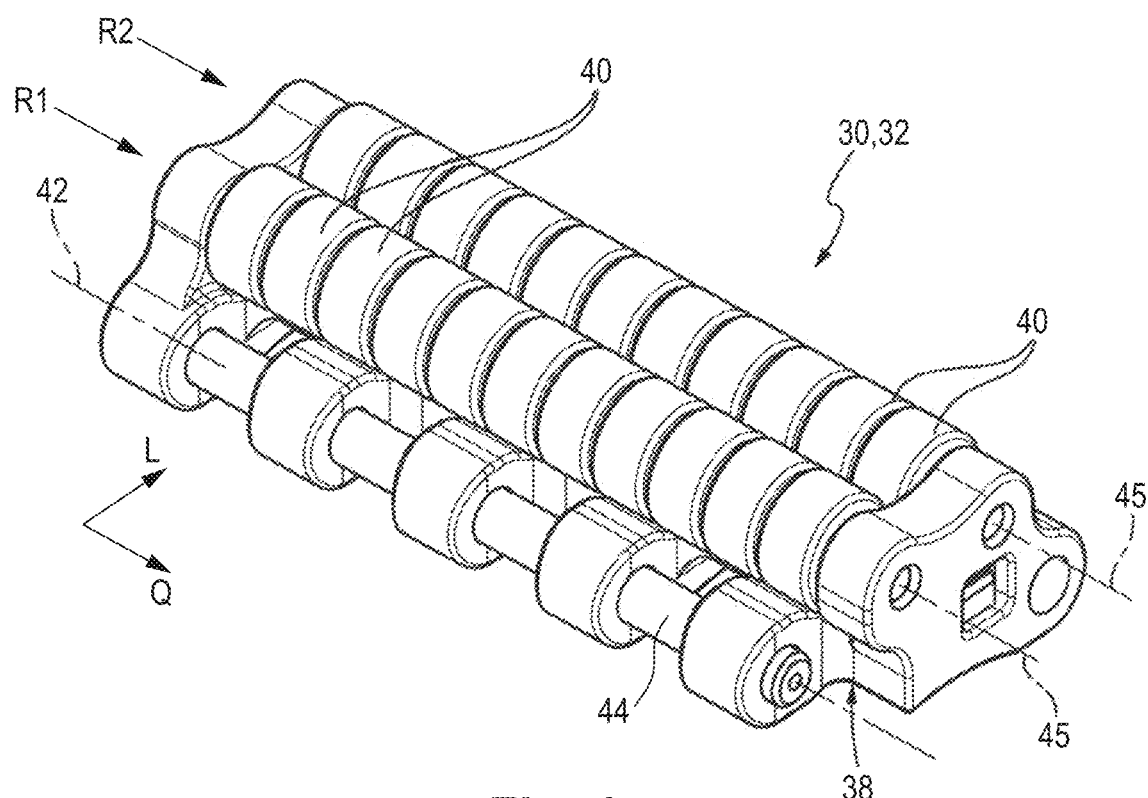
FIG. 4 shows a perspective view of an isolated shown link of the belt conveyor of FIG. 3.

FIG. 4 shows a perspective view of an individual unconnected link 30 of FIG. 3 comprising, by way of example, twenty-two rollers 40. For example, the rollers 40 are arranged in two rows R1 and R2 of respectively eleven rollers 40 parallel to one another and parallel to the transverse direction Q (width direction of the conveyor belt 24). The rollers 40 are freely rotatable about roller axes 45. The roller axes 45 are oriented parallel to the transverse direction Q. The rollers 40 are freewheeling in the transport direction TR, i.e. are substantially supported torque-free.

The roller axes 45 may have an axial play so that a gap width, i.e. a clear distance, between the rollers 40 in the longitudinal direction L can be variable. The rows R1 and R2 of FIG. 4 are spaced apart from each other in the longitudinal direction L of the belt 24, i.e. the rows R1 and R2 define a gap between them in the longitudinal direction L. It is understood that the rows R1 and R2 may generally each be loaded with a different number of rollers 40. Further, it is understood that more or less than two rows R can be provided.

In general, the rollers 40 are arranged along an upper side of the conveyor belt 24 for defining a (flat) transport surface TF. The transport surface TF is oriented (in the mathematical ideal case) tangentially to the rollers 40 and defined by support points or areas where the rollers and the conveying items 46 (not shown here) touch each other. In practice, however, the transport surface TF is defined as an undulating surface where the conveying items 46 to be transported and the rollers 40 touch each other over an area. During the transport, the conveying items 46 rest on the rollers 40.

The conveying items 46 can be accumulated on the belt conveyor 12 by moving an obstacle (e.g., movable stop into the conveying path) above the rollers 40 transversely into the transport path and stopping the conveying items on the belt 24 in this manner, so that the stopped conveying items 46 on the freewheeling rotating rollers 40 come to a rest even though and while the belt 24 continues to move continuously. The accumulation can be released by moving the obstacle out of the transport path again, so that the conveying items 46 are driven again (by rolling friction) by the belt conveyor 24.

Figure 5:
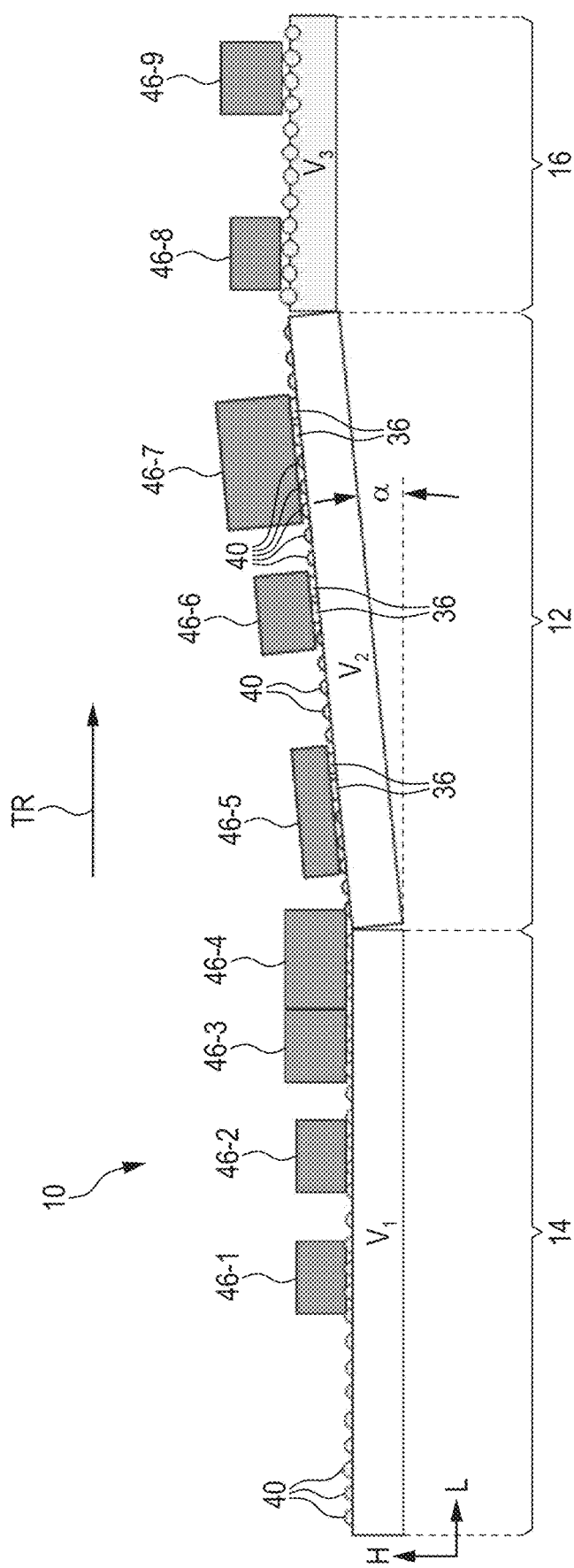
FIG. 5 shows a side view of a conveyor system.

An accumulation situation is shown by way of example at a downstream end of a feeding conveyor 14 in the side view of FIG. 5. FIG. 5 shows a first embodiment of a conveyor system 10 formed according to FIG. 1.

The conveyor system 10 of FIG. 5 comprises (conveying-stream-downwards directly adjacent to each other) a feeding conveyor 14, a belt conveyor 12, and a discharging conveyor 16. The belt conveyor 12 comprises an endless circulating conveyor belt 24 according to FIG. 2. The feeding conveyor 14 can be a conventional endless circulating belt conveyor (with or without rollers), which thus in comparison to FIG. 2 merely does not comprise driving portions 36—and thus no second links 34—but can be formed otherwise preferably analogously to the belt conveyor 24 of FIGS. 3 and 4. Preferably, the discharging conveyor 16 is a classic continuous conveyor such as an (endless circulating) belt conveyor, a link-chain conveyor (with, cf. FIG. 3, or without freewheeling rollers 40), or a roller conveyor consisting of discretely arranged rollers.

The feeding conveyor 14 and the discharging conveyor 16 are oriented, for example, horizontally while the centrally arranged belt conveyor 12 preferably comprises an angle of inclination $\alpha$ relative to the horizontal, which is in a range from 2° to 30°, preferably from 3° to 15°, and more preferably from 3° to 10°.

The feeding conveyor 14 is operated as an accumulation conveyor by operating the same preferably in an endless circulating manner. The conveying items 46-1 and 46-2 move at a (constant) speed v1 downstream. The speed v1 corresponds to the (constant) speed at which the multi-link belt 24 of the feeding conveyor 14 is moved permanently and relative to the machine frame 26 of the feeding conveyor. Despite the moving belt 24, the conveying items 46-3 and 46-4 are stationary, however, i.e. they have a speed of substantially zero if smaller possible oscillation movements (forwards and backwards) are disregarded in practice, which are caused by the permanent (rolling friction) force transmission due to the rolling friction between the rollers 40 and the bottom sides of the conveying items 46-3 and 46-4 onto these conveying items 46-3 and 46-4. It is understood that the feeding conveyor 14 could also be designed, for example, without rollers 40. In this case, the roller-free links 30 would transmit a force to accumulated conveying items 46 by means of sliding friction.

The frictional force transmission ensures a certain accumulation pressure in the transport direction TR, i.e. a force that actually pushes the conveying items 46-3 and 46-4 in the transport direction TR permanently forward, i.e. from left to right in FIG. 5. The accumulation pressure, or the corresponding force, presses the conveying items 46-3 and 46-4 against each other and against the ascending belt 24 of the centrally arranged belt conveyor 12. The front conveying item 46-4 protrudes with a front portion in the transport direction slightly into the central belt conveyor 12, in particular until the downhill force of the conveying item 46-4 and the accumulation pressure cancel each other out. The downhill force represents the above-mentioned "obstacle" that causes the accumulation.

A degree of overlap between the conveying item 46-4 and the belt conveyor 12 determines the location where the conveying item 46-4 are taken away. The conveying items 46 are driven in the area of their leading edges.

The centrally arranged belt conveyor 12 of FIG. 5 is formed in accordance with FIG. 2, i.e. it comprises, in particular locally discretely distributed, second links 34 including driving portions 36, which ensure that the conveying items 46-5 to 46-7 are driven by the belt 24 of the belt conveyor 12 despite the freewheeling rollers 40 thereof. The driving portions 36 will be described again in more detail with reference to FIG. 6.

Preferably, the belt conveyor 12 of FIG. 5 is operated continuously, and in particular at a constant speed v2. The speed v2 can be identical to the speed v1. However, it is understood that the belt conveyor 12 can also be operated discretely and at other, higher or lower, speeds v2. Preferably, the speeds v1 and v2 are of similar magnitude in order to prevent the belt conveyor 12 from running empty or to prevent the (single-track) feeding conveyor 14 from clogging.

The discharging conveyor 16 is operated at a speed v3, which is in particular constant and identical to the speed v2. The discharging conveyor 16 is operated temporarily synchronously with the belt conveyor 12. These measures ensure that the conveying items 46 are not displaced during the transition from the belt conveyor 12 to the discharging conveyor 16.

Figure 6:
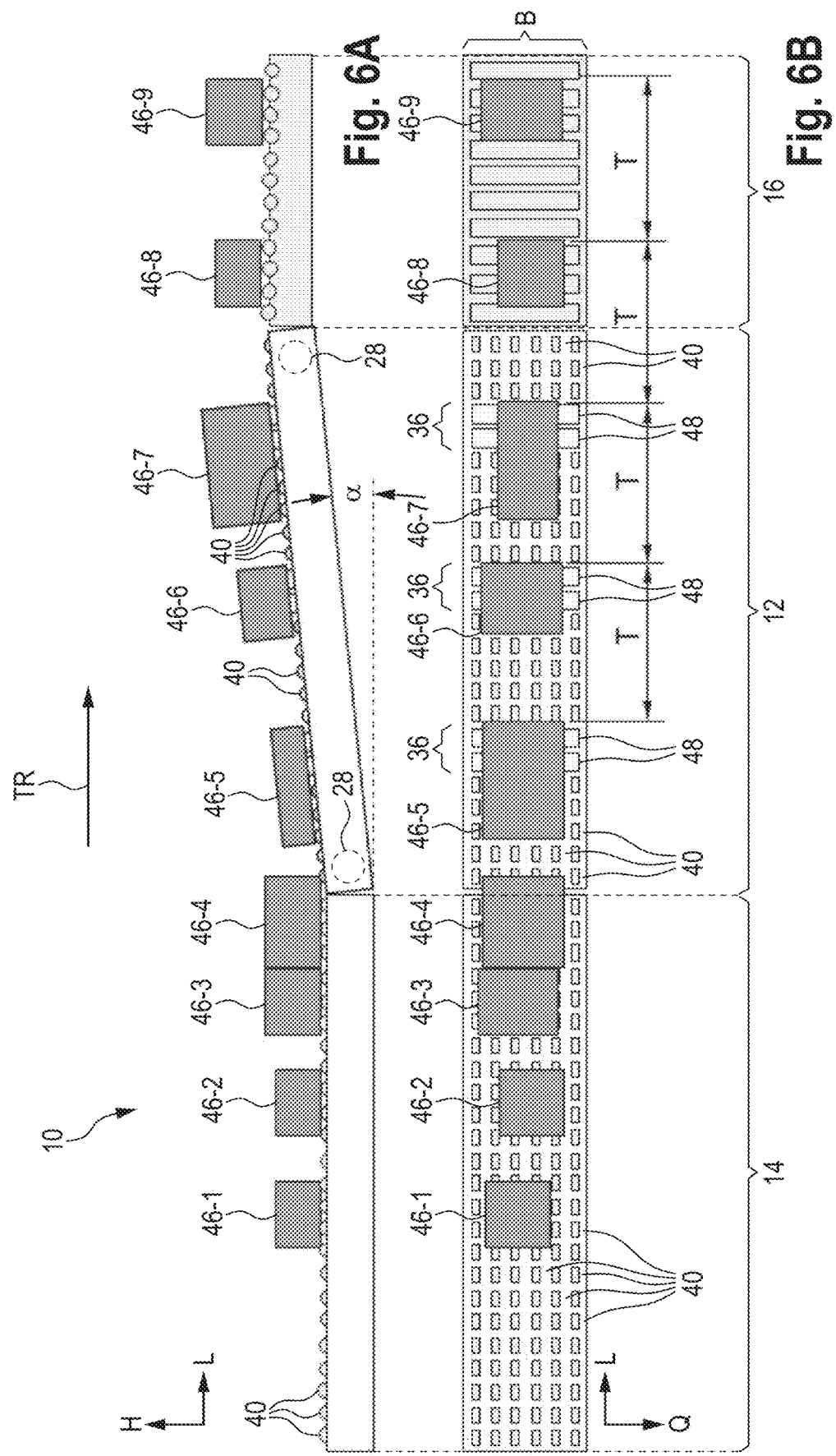
FIG. 6 shows a side view (FIG. 6A) and a top view (FIG. 6B) of a single-track conveyor system.

FIG. 6 shows a first application using the system 10 of FIG. 1 with a single-track arrangement of the conveyors 12, 14, and 16 in accordance with FIG. 5. FIG. 6A shows the same side view as FIG. 5. FIG. 6B shows a top view of the system 10 of FIG. 6A. The conveying items 46-1 to 46-9 of FIG. 6 are shown in the same states as in FIG. 5. The conveyors 12, 14, and 16 of FIG. 6 form one track by being arranged downstream directly behind one another. The belt conveyor 12 of FIG. 6 is used as a separating conveyor 20 (cf. FIG. 1) in order to create an arbitrarily adjustable distance in the longitudinal direction L, or in the transport direction TR, between the respective leading edges of the conveying items 46.

The top view of FIG. 6B illustrates the regularly distributed grid-like arrangement of the freewheeling rollers 40 in relation to the belts 24 of the conveyors 12 and 14. In comparison to the feeding conveyor 14, however, the belt 24 of the belt conveyor 12 comprises in addition to the freewheeling rollers 40 several additional driving portions 36, which are simply designed as separate driving elements 48 being attached to the rollers 40 in a desired distance relative to each other.

In FIG. 6 three driving portions 36 are illustrated by way of example, each of which is defined by, for example, two driving elements 48. It is understood that more or less driving portions 36 may be provided. In particular, one single driving portion 36 only could be provided which, due to the endless circulation, causes the conveying items 46-3 and 46-4 to be separated (also with a distance between them depending on the length of the belt 24).

In FIG. 6 the driving portions 36 are arranged at a predetermined distance, or pitch, T to each other in the transport direction TR. The distance T is defined, for example, between a leading edge of one of the driving portions 36 and a leading edge of a neighboring one of the driving portions 36. The distance T could also be defined between leading and trailing edges of neighboring conveying items 46, in particular, if the conveying items all have the same dimensions. Preferably, the distance T is selected such that the conveying items 46 directly following one another in the conveying stream, i.e. neighboring conveying items 46, have a conveying gap between them. Preferably, the distances T between, in the transport direction TR, neighboring driving portions 36 are all the same.

It is understood that the belt conveyor 12 of FIG. 6 comprises more than three driving portions 36 in the longitudinal direction L, wherein the remaining ones are merely covered, i.e. not visible. In FIG. 6, the upper run of the belt 24 can be seen only. The number of driving portions 36 along the length of the belt 24 can be selected as desired. The number can also be one, wherein the distance T is adjusted due to the circulation of the belt 24 nevertheless.

In FIG. 6 the driving portions 36 are formed as separate driving elements 48, which can be attached (subsequently) to a conventional link-belt accumulation roller conveyor, positioned depending on the application, and also be removed again. Alternatively or additionally, the driving portions 36 could also be implemented by the links 30, in particular the rollers 40 of the first links 32 (cf. FIG. 2), by changing the running properties thereof, in particular the rolling resistance of the rollers 40, as will be explained in more detail below.

The driving elements 48 of FIG. 6 are, by way of example, strip-shaped and configured to cover six freewheeling rollers 40, which are adjacent to each other in the transverse direction Q, and one roller 40 in the longitudinal direction L. It is understood that the length and width of the (separate) driving elements 48 is selected depending on the application. Application-dependent means, in particular, depending on the dimensions of the conveying items 46 and/or depending on the desired distance T.

In FIG. 6 the rollers 40 are evenly distributed in rows over the entire width B of the belt conveyor 12. The driving elements 48 cover selected rows of the rollers 40 so that these rollers 40 are no longer part of the transport surface TF and also no longer come into contact with the bottom sides of the conveying items 46 to be transported. The driving elements 48 are made of a material that has a higher coefficient of friction than the rollers 40. This means that the driving elements 48 have a better grip than the freely rotating rollers 40, and therefore transmit greater forces, which are caused by friction, to the conveying items 46.

The friction generally describes an inhibition of a movement, or resistance, that opposes a movement. Here, it must be made distinguished between: static friction, where the bodies in contact do not move relative to each other; sliding friction, where the surfaces of the bodies move relative to each other; and rolling friction, where one body rolls on the other body.

Sliding friction occurs, for example, when a body is pressed against another body by a force and one body slides relative to the other body. Sliding frictional forces are caused by the fact that the surfaces of the materials microscopically are never perfectly smooth but rough. This causes the molecules on the two surfaces to "catch" on each other. This then manifests itself macroscopically as (frictional) force acting against the movement direction. In this case, the sliding friction is lower than the static friction. The rolling friction is lower than the sliding friction. Under comparable conditions, the rolling friction is considerably lower than the sliding friction.

The frictional force is proportional to the weight force, or normal force, of a body and is independent of the size of a contact surface.

The coefficient of friction, also known as the coefficient of frictional resistance or number of friction (formula symbol $\mu$ or f), is a dimensionless proportionality factor expressing the ratio of the corresponding frictional force (static, sliding or rolling-friction force) to the contact pressure (normal force) between two bodies. The number of friction $\mu$ depends on the surface structure, or the material, of the bodies, particularly in case of static friction and dynamic, i.e. sliding, friction. The number of rolling friction does not only depend on the material pairing of the bodies in contact but also on the geometry, in particular the radius of the rolling body. The number of friction is always defined for specific material pairings (e.g., cardboard on plastic). In the following, the specific material pairing will no longer be listed for the sake of simplification, wherein the number of friction always stands for a unit-conveying item on the respective material of the driving portion 36.

Returning to FIG. 6, the driving elements 48 thus have a higher coefficient of friction than the (rotating) rollers 40 when they come into contact with the bottom sides of the conveying item 46-4. The frictional resistance caused thereby is sufficiently high to overcome the downhill force of the conveying item 46-4, and thus to drive the conveying item 46-4 as already illustrated for the conveying items 46-5 to 46-7. Although in FIG. 6 respectively two driving elements 48 are attached one behind the other in the transport direction TR on two rows of rollers, one of the driving elements 48 alone may already be sufficient for driving since the frictional force is independent of the surface area, as already explained above, provided that an equally large normal force acts between the conveying item 46 and the driving elements 48.

As soon as the conveying items 46-5 to 46-7 reach the downstream end of the central belt conveyor 12 they are taken over by the discharging conveyor 16. The discharging conveyor 16 is operated preferably at the same speed as the belt conveyor 12 so as not to change the gaps, which are set there, between the conveying items 46. The length of the gaps is identical if the conveying items 46 are identically dimensioned (and aligned). It is understood that in the transition area between the conveyors 12 and 16, the length of the gaps can be influenced additionally by a suitable selection of the speed v3 of the discharging conveyor 16.

Figure 7:
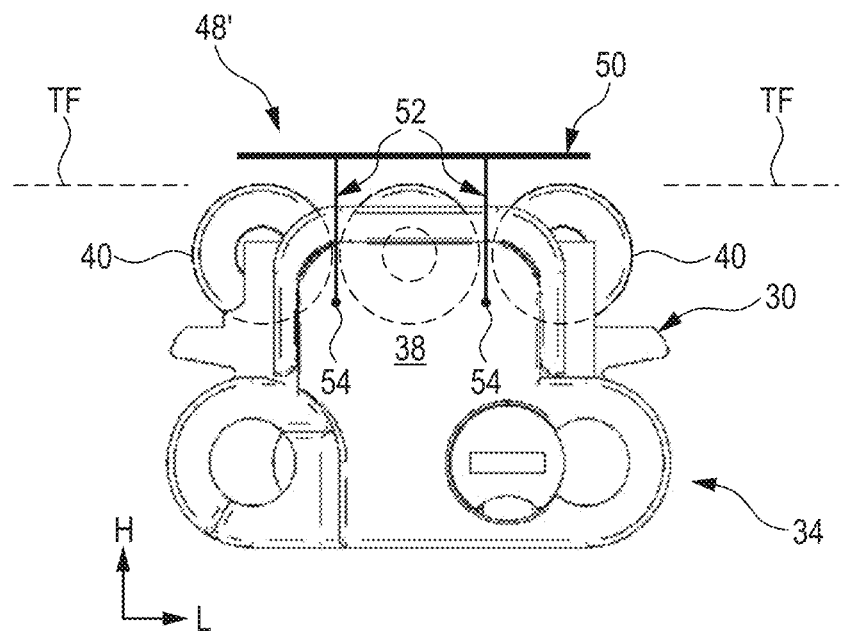
FIG. 7 shows a side view of a second link.
Figure 8:
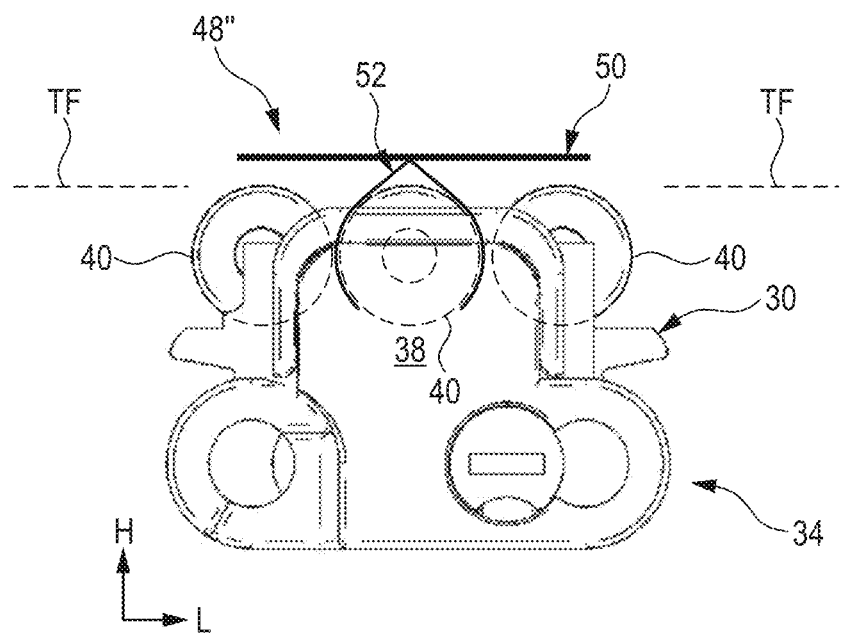
FIG. 8 shows a side view of a slightly modified link designed basically like the link of FIG. 7.

With reference to FIGS. 7 and 8 different configurations of separately provided driving portions 36, i.e. configurations of driving elements 48, will be described in the following, which can be used instead of, or in addition to, the driving elements 48 of FIG. 6.

FIG. 7 shows a side view of an individual (conventional) link 30 of a (conventional) belt conveyor 24 including freewheeling rollers 40 according to DE 10 2012 104 891 A1, which is referred to with regard to the structure of the corresponding conveyor belt 24 consisting exclusively of first links 32. Three parallel rows of freewheeling rollers 40 are supported in the basic body 38, which are spaced apart from each other in the longitudinal direction L and usually define in the height direction H on their top sides the transport surface TF. The driving element 48' of FIG. 7 is inserted into the link 30 from above, i.e. is mounted detachable and in a loss-proof manner, whereby the conventional first link 32 becomes a second link 34 according to the invention in terms of FIG. 2.

The driving element 48' of FIG. 7 comprises a supporting portion 50, formed like a surface area, and, for example, two finger-like engagement portions 52. The supporting portion 50 and the engagement portions 52 are connected to each other, and preferably are formed in one piece.

The supporting portion 50 extends in the mounted state shown in FIG. 7 substantially horizontally, i.e. in the QL plane. Length of the supporting portion 50 in the longitudinal direction L is selected such that the supporting portion 50 covers all rollers 40 of the corresponding link 30. If the link comprises more or less rollers 40 in the longitudinal direction L, the supporting portion 50 is formed correspondingly shorter or longer. The supporting portion 50 ends in the longitudinal direction L preferably just outside the highest point of the roller 40, which usually comes into contact with the conveying item 46 (not shown here). If the link 30 comprises in the longitudinal direction L one single roller 40 only, the supporting portion 50 is thus correspondingly shorter than in FIG. 7 in the longitudinal direction L. However, the supporting portion 50 preferably does not project beyond the corresponding link 30, or the basic body 38 thereof, in the longitudinal direction L in order to not disturb the deflection around the pulleys 28 (cf. FIGS. 2 and 6) and possibly not get lost there.

The engagement portions 50 of FIG. 7 extend vertically, i.e. parallel to the height direction H, and comprise at their lower free ends preferably one thickening 54 respectively, which is dimensioned in the longitudinal direction L greater than a clear distance between the rollers 40.

At least the (in the longitudinal direction L) outer rollers 40 can be supported with a certain axial play 56 in the basic body 38 (or alternatively in a bearing attached to the basic body 38). During the assembly, the engagement portions 52, which are preferably formed rigidly, urge at least the outer rollers 40 in the longitudinal direction L outward in order to give the thickenings 54, downwards through the gaps between the rollers 40, a clear path. As soon as the thickenings 54 have passed through these gaps between the rollers 40, the rollers 40 automatically return to their original normal positions. The rollers 40 themselves can be deformable elastically. The supporting of the rollers 40 can cause elastic restoring forces. The driving element 48' is then fixed between the rollers 40 so that it cannot be lost, and can be moved at any time (in the longitudinal direction L and/or in the transverse direction Q) arbitrarily, in particular for adapting the distances T (cf. FIG. 6) in an application-specific manner.

FIG. 8 shows the link 30 of FIG. 7, on which a modified driving element 48" is mounted. The driving element 48' of FIG. 7 and the driving element 48" of FIG. 8 substantially differ in the engagement portions 52.

The driving element 48" of FIG. 8 comprises one engagement portion 52 only. The engagement portion 52 of FIG. 8 is formed elastically. The engagement portion 52 is claw-shaped and configured to be positively attached from above onto the central roller 40. Finger-like portions of the engagement portion 52 of FIG. 8 preferably are round in the side view in order to fit snugly around the roller 40.

In a further variant, which is not illustrated in the FIGS. 7 and 8, the driving elements 48 could also be formed such that they are detachably mounted on the basic bodies 38 of the links 30 instead of on the freewheeling rollers 40. For example, the basic bodies 38 and the driving elements 48 could be configured such that the driving elements 48 are bolted to the basic bodies 38. Any other type of, preferably separable, connection of the separately provided driving elements 48 to the links 30 is possible, wherein positive and non-positive connections are preferred over material-positive connections.

After having described second links 34 (cf. FIG. 2), by way of example using FIGS. 7 and 8 which convert a conventional conveyor belt 24 of first links 32 including freewheeling rollers 40 into a belt conveyor 12 according to the invention by mounting separately provided driving elements 48 on the first links 32 in order to convert them into second links 34, further variants are described hereinafter in which the conveyor belt 24 is actually formed of different links 30.

Figure 9:
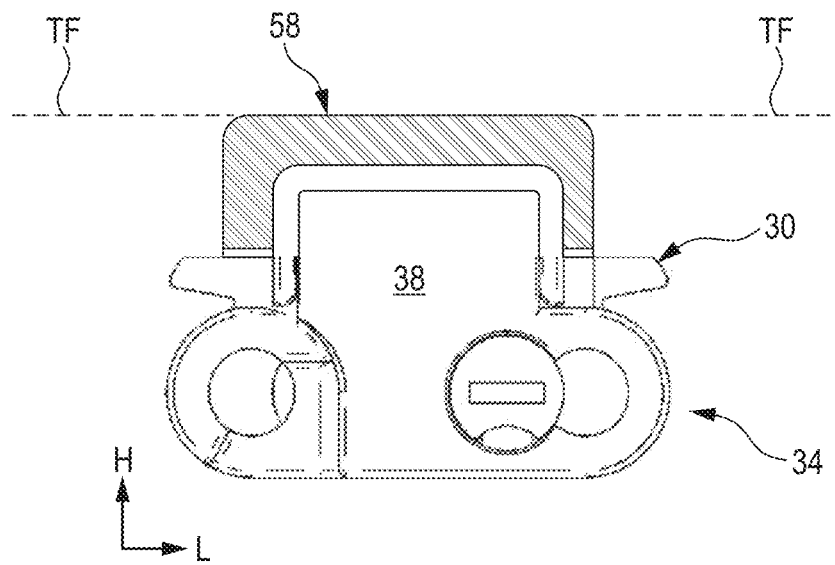
FIG. 9 shows a side view of a still further modified link.

The corresponding conveyor belts 24 are substantially formed of first links 32 of the type described above, whereas additional second links 34 are provided which manage without additional driving elements 48 by either configuring the rollers 40 thereof so that they cause a variable frictional resistance or by replacing the rollers with friction elements 58, cf. FIG. 9.

These second links 34 are configured to replace the first links 32 in the articulated connection of the belt conveyor 24. In practice, this means that (locally) selected first links 32 are replaced by the second links 34 by, for example, dismantling the corresponding first links 32 from the belt 24 and replacing them which the second links 34, which are subsequently assembled. In these cases, changing the (relative) location of the driving portions within the belt 24 is somewhat more difficult than in the embodiments of FIGS.

7 and 8, because the "chain" has to be dismantled and then reassembled. However, the desired functionality is achieved with the same effect.

Ideally, the second links 34 are substantially formed identical to the first links 32 with respect to an external shape, in particular by comprising a compatible basic body 38 and analogously arranged rollers 40. However, the rollers 40 can either be selectively locked, or rolling resistance thereof is variable. If the rollers 40 can be selectively locked, they can either rotate freely, and thus are freewheeling, or rotation thereof can be blocked, for example, by inserting a cotter pin from the outside so that they no longer rotate. In this case, the frictional resistance on the conveying items 46 changes from rolling friction to sliding friction, so that greater frictional forces are transmitted from the rollers 40 to the (bottom sides of the) conveying items 46, while the conveyor belt 24 is moved continuously under the successively delivered conveying items 46, so that the bottom sides of the conveying items 46 are (temporarily one after the other) at least partially in contact with the moving conveyor belt 24, see, for example, the situation in FIG. 6.

Alternatively, the running characteristics, or rotation characteristics, of the rollers 40 may be influenced selectively such that the rollers 40 turn more sluggishly and thus cause greater rolling resistance. This can be achieved, for example, by using thicker axes, which do not rotate or rotate more sluggishly, in their bearings and on which the slidingly supported rollers 40 do not rotate or rotate more sluggishly.

Instead of influencing the rolling characteristics of the rollers 40, the at least one roller 40 can also be replaced by a static element, such as a friction element 58. This is illustrated schematically in FIG. 9, where the link 30 of FIGS. 7 and 8 has been modified accordingly.

FIG. 10 illustrates an alternative application of the belt conveyor 12 of FIG. 1 in a conveyor system 10 structured, by way of example, almost identical to the conveyor system 10 of FIGS. 5 and 6. In contrast to the system 10 of FIG. 6, which has a single-track structure, the system 10 of FIG. 10 comprises, in the area of the feeding conveyor 14 and the belt conveyor 12, two tracks SP1 and SP2, which are combined into a single track with a smaller overall width in the area of the discharging conveyor 16. FIG. 10 illustrates an example in which the belt conveyor 12 adopts the function of a fusion conveyor 22 mentioned in FIG. 1.

FIG. 10A shows a side view and FIG. 10B shows a top view of the system 10 of FIG. 10. The belt conveyor 12 and the feeding conveyor 14 are each formed with two tracks SP1 and SP2. The tracks SP1 and SP2 of the belt conveyor 12 can, for example, be provided alternatively with driving portions 36. The driving portions 36-1 and 36-3 are arranged in the track SP1. The driving portion 36-2 is arranged in the track SP2 of the belt conveyor 12. Instead of the belt conveyor 12, which is composed of two conveyor belts 24 arranged, for example, directly adjacent to each other in the transverse, i.e. width, direction Q, a belt conveyor 12 with a single belt conveyor 24 being twice as wide (not illustrated) can be used. The conveying items 46 may also be fed on a single track (with a conveyor twice as wide) (not illustrated). In FIG. 10, the driving portions 36 are formed, by way of example, of the driving elements 48, as in FIG. 6.

The distances T between the driving portions 36-1 to 36-3 can be selected to be constant in the longitudinal direction L, as in FIG. 6. However, the driving portions 36-1 and 36-3 of the first track SP1 have a relative distance to each other of 2T. The driving portion 36-2 of the second track SP2 is arranged—in the longitudinal direction L—centrally between the driving portions 36-1 and 36-2, but laterally displaced relative to the driving portions 36-1 and 36-2 in the transverse direction Q. Thus, the side view of FIG. 10A shows the same picture as in FIG. 6A, although additional conveying items 46-10 to 46-12 are present, which form a second conveying stream that is to be fused with the first conveying stream on the first track SP1.

The two tracks SP1 and SP2 are merged at a downstream end of the belt conveyor 12 to form one single track. The discharging conveyor 16 can again be implemented by a roller conveyor and can additionally comprise two guiding elements 60 in order to unite the conveying streams of the input-side tracks SP1 and SP2 to one single track. The guiding elements 60 are arranged vertically above the transport surface TF. The guiding elements 60 can be realized by plate-shaped elements, similar to guardrails. The guiding surfaces of the guiding elements 60 are oriented substantially perpendicular. The guiding elements 60 can also be belt conveyors being vertically oriented and set at the same speed as the discharging conveyor in order to prevent the conveying items 46, or cases, from shifting relative to each other opposite to the transport direction TR due to friction on static guiding elements. In the top view of FIG. 10B, the guides 60 are oriented downstream, preferably at the same angle, towards the center of the transverse direction Q.

Figure 11:
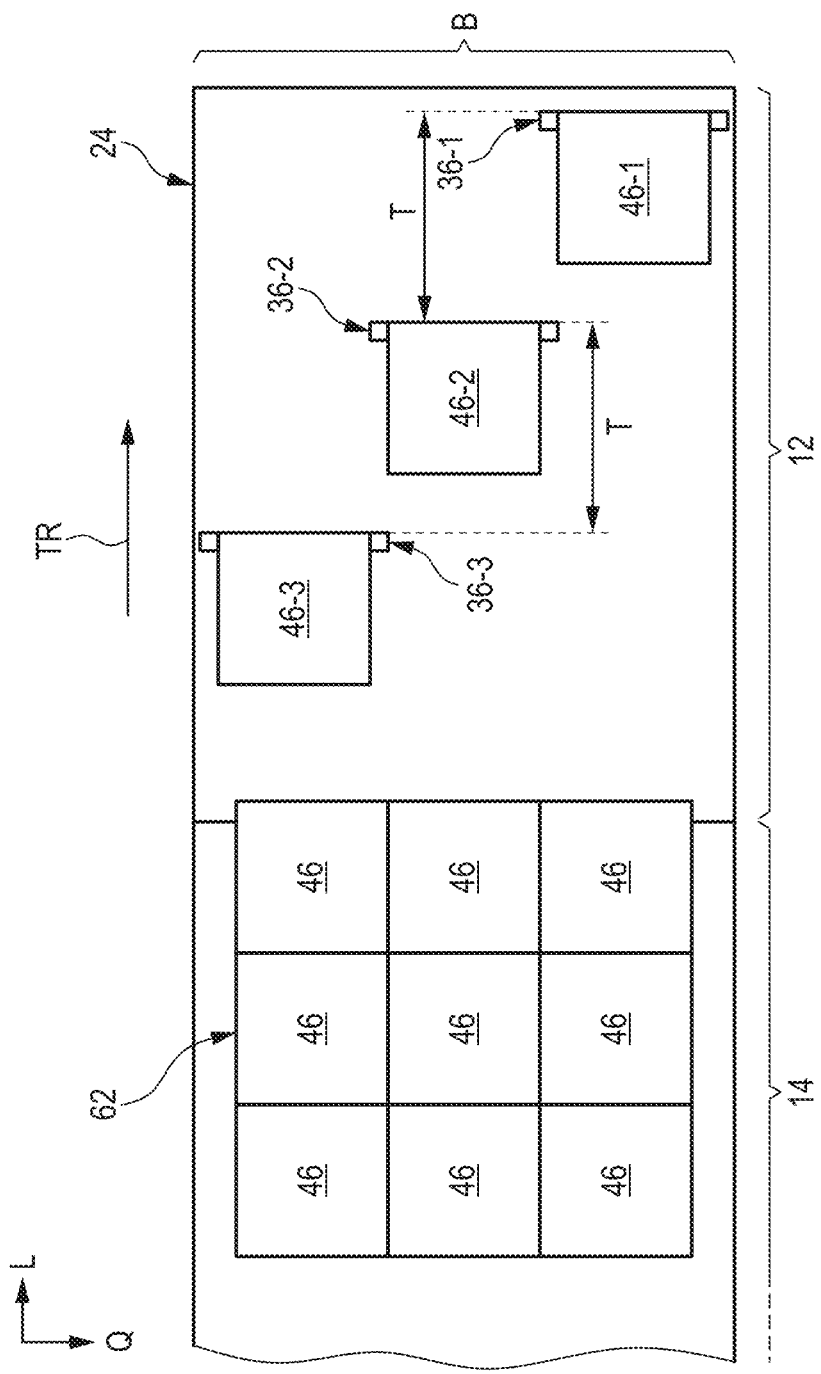
FIG. 11 shows a top view of a further embodiment of a conveyor system used as pallet-layers separating device.

With reference to FIG. 11, a further application of the belt conveyor 12 of FIG. 1 is described below. The belt conveyor 12 can also be used for separating cases in a pallet layer, as schematically illustrated in FIG. 11. In this case, the cases represent the conveying items 46.

FIG. 11 shows a top view of a belt conveyor 12 and a feeding conveyor 14 being part of a system 10. A discharging conveyor 16, which includes guiding elements 60, is not shown, but can be adjacent downstream to the belt conveyor 12 as shown in FIG. 10. A pallet layer 62 of, preferably identically dimensioned, conveying items 46 is provided via the feeding conveyor 14. The pallet layer 62 is comprised of, by way of example, twelve conveying items 46, the conveying items 46-1 to 46-3 of which have already been withdrawn, i.e. separated from the conveyor belt 24 of the belt conveyor 12 in the desired distance T.

The (visible) driving portions 36-1 to 36-3 are evenly distributed over the width B of the conveyor belt 24 in the transverse direction Q and are spaced by T in the longitudinal direction L. The belt 24 in turn comprises a plurality of (not shown) freewheeling rollers 40 on which driving elements 48 have been mounted.

Thus, various applications of the belt conveyor 12 and various configurations of the driving portions 36 have been described. It has been described that conventional accumulation-roller conveyors including freewheeling (support) rollers can be subsequently converted into multi-link belt conveyors 12 according to the invention. The belt conveyor 12 creates desired distances between the conveying items 46 by simple mechanical means, and does not require expensive or complex additional systems which include cameras, actuators, and image-processing software and control software.

FIGS. 12-16 illustrate side views of modifications of second links 34. FIGS. 12-16 only partially show the corresponding conveyor belts 24 composed of the first and second links 32 and 34, wherein the first link 32 shown on the left is illustrated in a deflected state.

Figure 12:
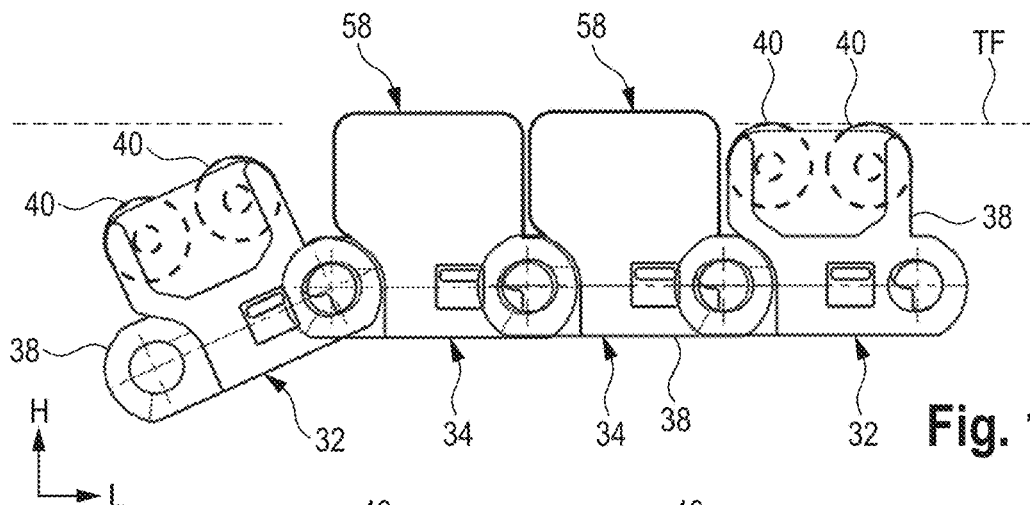
FIG. 12 shows a side view of a conveyor belt including second links formed by friction elements.

FIG. 12 shows roller-less second links 34 including friction elements 58, wherein the first links 32 are each provided with two rollers 40 (in the longitudinal direction L). The friction elements protrude vertically upwards from the transport surface TF.

Figure 13:
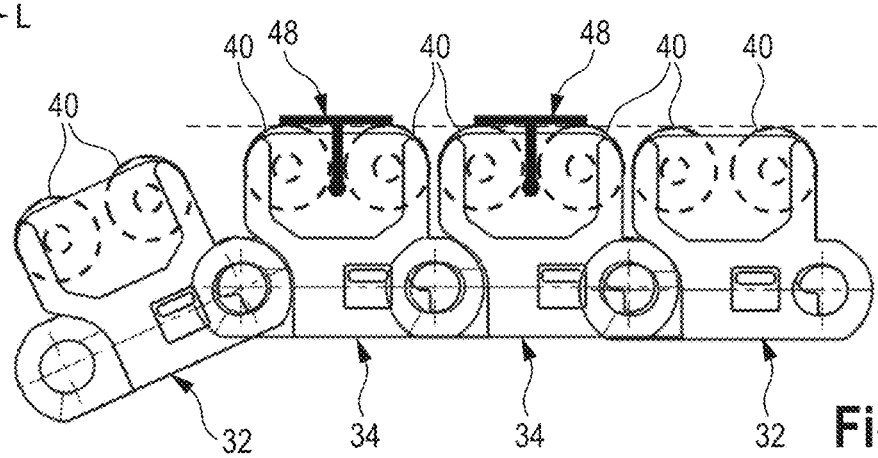
FIG. 13 shows a side view of a conveyor belt including links comprising respectively two support rollers one after the other in the longitudinal direction, wherein second links including separate driving elements are provided.

FIG. 13 shows a belt 24 formed of first links 32 each comprising two rollers 40, wherein respectively one separate driving element 48 is clipped between the rollers 40 of the central link 30 so that these become second links 34. Also here, the driving elements 48 protrude vertically upwards from the transport surface TF, which is defined by the rollers 40.

Figure 14:
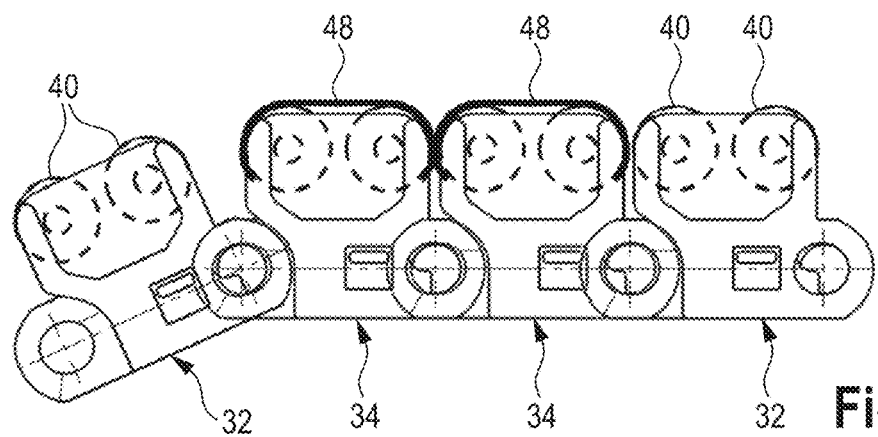
FIG. 14 shows a side view of a conveyor belt including links comprising respectively two support rollers one after the other in the longitudinal direction, wherein second links including other separate driving elements are provided.

FIG. 14 shows the belt 24 of FIG. 13, wherein differently shaped driving elements 48 are used, which are pulled (in the transverse direction Q) over both rollers 40 of the second links 34.

Figure 15:
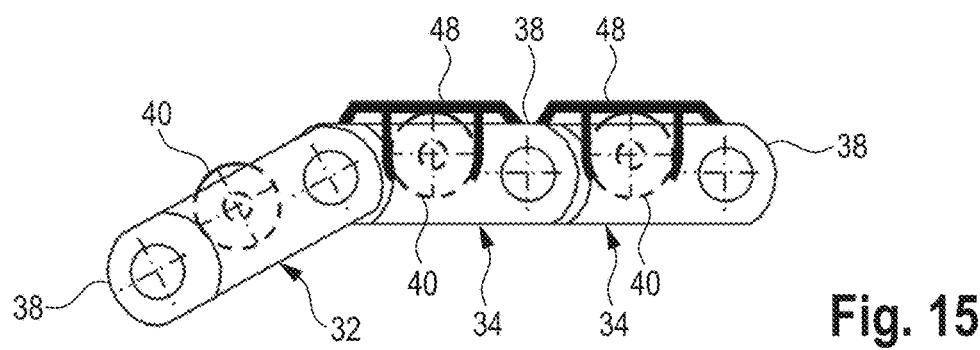
FIG. 15 shows a side view of a conveyor belt including links comprising respectively one support roller in the longitudinal direction, wherein second links including separate driving elements are provided.

FIG. 15 shows three links 30 of a belt 24, which are respectively provided with one roller 40, wherein the driving elements 48 of the second links 34 each are clipped onto the corresponding roller 40.

Figure 16:
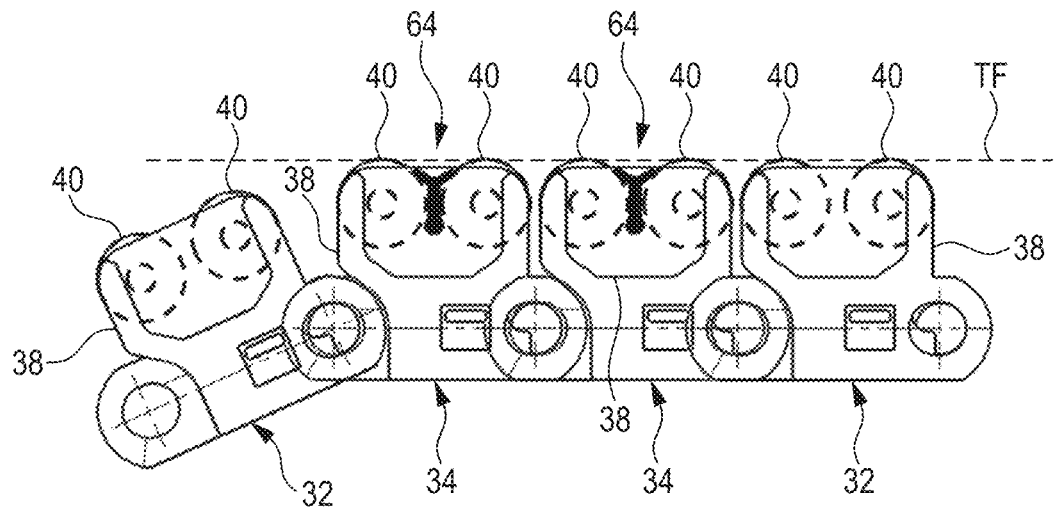
FIG. 16 shows a side view of a conveyor belt including links which comprise respectively two support rollers one after the other in the longitudinal direction, wherein the rollers of second links are locked.

FIG. 16 shows the belt 24 of FIGS. 12 and 13, wherein between the rollers 40 of the second links 34 respectively one locking element 64 is placed (in a manner removable again), which blocks the freewheeling of the rollers 40. The locking elements 64 does not reach into the transport surface TF.

LIST OF REFERENCE NUMERALS

10 conveyor system
12 belt conveyor
14 feeding conveyor
16 discharging conveyor
18 material-flow computer (MFC)
20 separating conveyor
22 fusion conveyor
24 conveyor belt
26 machine frame
28 pulleys
30 links
32 first link
34 second link
36 driving portion
38 basic body
40 rollers of first and second links
42 joint axis
44 joint pin
TF transport surface
45 roller axis
46 conveying good
R (roller) row
48 driving element
50 supporting portion
52 engagement portion
54 thickening
58 friction elements
60 guiding elements
62 pallet layer
64 locking element

The invention claimed is:

1. A belt conveyor configured to generate a predetermined transport distance between a first conveying item and a second conveying item along a transport direction of the belt conveyor, the belt conveyor comprising:
 a conveyor belt configured for endless circulation and formed of links connected to each other in an articulated manner;
 wherein the links comprise a plurality of first links each of which comprises at least one freewheeling roller having a first coefficient of friction for the conveying items;
 wherein contact areas between the freewheeling rollers and the conveying items define a transport surface on which the conveying items to be transported rest during transport on the belt conveyor;
 wherein the links further comprise at least one second link having a driving portion arranged in the transport surface and having a second coefficient of friction greater than the first coefficient of friction;
 wherein each of the second links is positioned in relation to the conveyor belt such that the first and second conveying items are driven by the respective driving portion in the predetermined transport distance while the conveyor belt is moved under the first and second conveying items and while bottom sides of the first and second conveying items are in contact at least partially with the moving conveyor belt, and
 wherein each of the links has the at least one freewheeling roller, and wherein the driving portion of the at least one second link is realized by the respectively one freewheeling roller, the freewheeling of which can be inhibited or locked.

2. The belt conveyor of claim 1, wherein each of the links has an identical basic body extending, during the transport, substantially perpendicular to the transport direction of the belt conveyor.

3. The belt conveyor of claim 2, wherein the at least one second link is formed roller-free so that the driving portion thereof, instead of the respectively at least one freewheeling roller of the first links, project into, or beyond, the transport surface.

4. The belt conveyor of claim 2, wherein the freewheeling rollers are attached in parallel rows perpendicular to the transport direction to the basic body of each of the links.

5. A belt conveyor configured to generate a predetermined transport distance between a first conveying item and a second conveying item along a transport direction of the belt conveyor;
 wherein the belt conveyor comprises a conveyor belt configured for endless circulation and formed of links connected to each other in an articulated manner;
 wherein the links comprise a plurality of first links each of which comprises at least one freewheeling roller having a first coefficient of friction for the conveying items;
 wherein contact areas between the freewheeling rollers and the conveying items define a transport surface on which the conveying items to be transported rest during transport on the belt conveyor;
 wherein the links further comprise at least one second link having a driving portion arranged in the transport surface and having a second coefficient of friction greater than the first coefficient of friction;
 wherein each of the second links is positioned in relation to the conveyor belt such that the first and second conveying items are driven by the respective driving portion in the predetermined transport distance while the conveyor belt is moved under the first and second conveying items and while bottom sides of the first and second conveying items are in contact at least partially with the moving conveyor belt, and
 wherein the links are all formed identically, and wherein the driving portion of the at least one second link is realized by a separate driving element covering the at least one freewheeling roller of the respective second link such that the corresponding driving element, instead of the at least one freewheeling roller of the respective second link, is in contact with the first and second conveying items during the transport.

6. The belt conveyor of claim 5, wherein the driving element is fixed in a form-fitting detachable manner on at least one of the freewheeling rollers of the respective second link.

7. The belt conveyor of claim 6, wherein the driving element is detachably attached to a basic body of the respective second link.

8. A conveyor system including:
a feeding conveyor
a discharging conveyor; and
a belt conveyor arranged in a transport direction between the feeding conveyor and the discharging conveyor;
the feeding conveyor and the discharging conveyor each being directly adjacent to the belt conveyor in the transport direction; and
the belt conveyor comprising a conveyor belt configured for endless circulation and formed of links connected to each other in an articulated manner;
wherein the links comprise a plurality of first links each of which comprises at least one freewheeling roller having a first coefficient of friction for the conveying items;
wherein contact areas between the freewheeling rollers and the conveying items define a transport surface on which the conveying items to be transported rest during transport on the belt conveyor;
wherein the links further comprise at least one second link having a driving portion arranged in the transport surface and having a second coefficient of friction greater than the first coefficient of friction;
wherein each of the second links is positioned in relation to the conveyor belt such that the first and second conveying items are driven by the respective driving portion in the predetermined transport distance while the conveyor belt is moved under the first and second conveying items and while bottom sides of the first and second conveying items are in contact at least partially with the moving conveyor belt, and
wherein each of the links has the at least one freewheeling roller, and wherein the driving portion of the at least one second link is realized by the respectively one freewheeling roller, the freewheeling of which can be inhibited or locked.

9. The conveyor system of claim 8, wherein
the belt conveyor is operated at a first speed,
the feeding conveyor is operated at a second speed less than or equal to the first speed, and
the discharging conveyor is operated at a third speed corresponding to the first speed.

10. The conveyor system of claim 9, wherein the first speed is continuous.

11. The conveyor system of claim 8, wherein
the feeding conveyor and the discharging conveyor are oriented horizontally, and
the belt conveyor is oriented in the transport direction with an angle of inclination $\alpha$.

12. The conveyor system of claim 11, wherein the angle of inclination $\alpha$ is in a range from 2° to 30°.

13. The conveyor system of claim 8, wherein the feeding conveyor is configured and arranged to provide the first and second conveying items one after the other at a downstream end so that the freewheeling rollers of the first links of the belt conveyor are permanently in contact at least with the downstream end portion of a bottom side of the conveying items provided.

14. The conveyor system of claim 8, wherein the belt conveyor is operated permanently at a speed.

15. The conveyor system of claim 14, wherein the speed is constant.

16. The conveyor system of claim 8, wherein the belt conveyor is one of a separating conveyor, a fusion conveyor, or pallet-layer separating device.

17. The conveyor system of claim 8, wherein the belt conveyor has a multi-track design.

18. The conveyor system of claim 8, wherein the feeding conveyor is an accumulation link chain conveyor with or without freewheeling support rollers.

19. A conveyor system including:
a feeding conveyor;
a discharging conveyor; and
a belt conveyor arranged in a transport direction between the feeding conveyor and the discharging conveyor;
the feeding conveyor and the discharging conveyor each being directly adjacent to the belt conveyor in the transport direction; and
the belt conveyor comprising a conveyor belt configured for endless circulation and formed of links connected to each other in an articulated manner;
wherein the links comprise a plurality of first links each of which comprises at least one freewheeling roller having a first coefficient of friction for the conveying items;
wherein contact areas between the freewheeling rollers and the conveying items define a transport surface on which the conveying items to be transported rest during transport on the belt conveyor;
wherein the links further comprise at least one second link having a driving portion arranged in the transport surface and having a second coefficient of friction greater than the first coefficient of friction;
wherein each of the second links are positioned in relation to the conveyor belt such that the first and second conveying items are driven by the respective driving portion in the predetermined transport distance while the conveyor belt is moved under the first and second conveying items and while bottom sides of the first and second conveying items are in contact at least partially with the moving conveyor belt; and
wherein the links are all formed identically, and wherein the driving portion of the at least one second link is realized by a separate driving element covering the at least one freewheeling roller of the respective second link such that the corresponding driving element, instead of the at least one freewheeling roller of the respective second link, is in contact with the first and second conveying items during the transport.

20. The conveyor system of claim 19, wherein:
the belt conveyor is operated at a first speed,
the feeding conveyor is operated at a second speed less than or equal to the first speed, and
the discharging conveyor is operated at a third speed corresponding to the first speed.

21. The conveyor system of claim 19, wherein:
the feeding conveyor and the discharging conveyor are oriented horizontally, and
the belt conveyor is oriented in the transport direction with an angle of inclination $\alpha$.

22. The conveyor system of claim 19, wherein the feeding conveyor is configured and arranged to provide the first and second conveying items one after the other at a downstream end so that the freewheeling rollers of the first links of the belt conveyor are permanently in contact at least with the downstream end portion of a bottom side of the conveying items provided.

23. The conveyor system of claim 19, wherein the belt conveyor is operated permanently at a speed.

24. The conveyor system of claim 19, wherein the belt conveyor is one of a separating conveyor, a fusion conveyor, or pallet-layer separating device.

25. The conveyor system of claim 19, wherein the belt conveyor has a multi-track design.

* * * * *